US 6,681,518 B2

(12) United States Patent
Aesch, Jr. et al.

(10) Patent No.: US 6,681,518 B2
(45) Date of Patent: Jan. 27, 2004

(54) TERMITE LURE; CONTAINER; AND METHOD

(76) Inventors: Harold W. Aesch, Jr., 915 E. Fork Dr., Phoenix, AZ (US) 85048; Kenneth R. Chitwood, 130 Shomate Dr., Longwood, FL (US) 32750

( * ) Notice: Subject to any disclaimer, the term of this patent is extended or adjusted under 35 U.S.C. 154(b) by 57 days.

(21) Appl. No.: 09/912,913

(22) Filed: Jul. 25, 2001

(65) Prior Publication Data

US 2002/0108295 A1 Aug. 15, 2002

Related U.S. Application Data

(63) Continuation-in-part of application No. 09/784,664, filed on Feb. 15, 2001.

(51) Int. Cl.[7] .................................................. A01M 1/10
(52) U.S. Cl. ..................................................... 43/132.1
(58) Field of Search ............................. 43/131, 132.1, 43/133

(56) References Cited

U.S. PATENT DOCUMENTS

| | | | | |
|---|---|---|---|---|
| 5,165,199 A | * | 11/1992 | Tallon | 43/124 |
| 5,921,018 A | * | 7/1999 | Hirose et al. | 43/131 |
| 6,016,625 A | * | 1/2000 | Bishoff et al. | 43/107 |
| 6,065,241 A | * | 5/2000 | Woodruff | 43/132.1 |
| 6,298,597 B1 | * | 10/2001 | Koehler et al. | 43/107 |
| 6,374,536 B1 | * | 4/2002 | Washburn | 43/131 |
| 6,378,243 B1 | * | 4/2002 | Snell et al. | 43/131 |
| 6,474,015 B1 | * | 11/2002 | Lund et al. | 43/124 |

* cited by examiner

Primary Examiner—Charles T. Jordan
Assistant Examiner—Susan C. Alimenti
(74) Attorney, Agent, or Firm—John D. Lister

(57) ABSTRACT

An insect lure or bait container for attracting insects for treatment with a pesticide has an opening therein for the subterranean ingress and egress of insects and, preferably, contains a cellulose fiber lure of a coherent deformable compressible mass of randomly oriented, entangled, softwood fibers that is held together by entanglement of the fibers. Preferably, for treating termite colonies, the pesticide is a non-repellent termiticide, which is lethal to termites through matrix contact as well as through ingestion and/or transferal.

14 Claims, 4 Drawing Sheets

TERMITE LURE; CONTAINER; AND METHOD

This patent application is a continuation-in-part of patent application Ser. No. 09/784,664, filed Feb. 15, 2001.

BACKGROUND OF THE INVENTION

The present invention relates to a cellulose fiber lure for termites that is formed from a coherent deformable compressible mass of randomly oriented, entangled, softwood fibers; a container especially adapted to house the cellulose fiber lure; and a method for treating termites or other insects through matrix contact with a pesticide or through the ingestion or transferal of a pesticide. While the container of the present invention can be used to treat other insects with pesticides, the container of the present invention is especially well suited for housing the cellulose fiber lure of the present invention for the treatment of termites with termiticides. The cellulose fiber lure of the present invention, unlike other wood lures, which must be torn apart by the termites over an extended period of time e.g. up to two months, is especially well suited for a rapid treatment of termite colonies with a termiticide, such as a termiticide that can function through matrix contact.

Termites do more property damage in the United States than hurricanes, earthquakes and vandalism combined. In order to control termites with a toxicant (hereinafter "termiticide"), termites must come in contact with the termiticide. Termites ingress and egress a food source through underground and above ground tunnel tubes which extend between a colony nest and the food source, e.g. a building. These tunnel tubes are climate controlled and impervious to termiticides sprayed on the soil and, for as long as the termites remain sealed within their tunnel tubes, the termites are protected from contact with the termiticides sprayed on the soil.

For decades, one method for controlling termites has included the saturation of the soil in a zone under and surrounding a building. To get the termiticide within the termite tunnel tubes, a trench is dug around the building. This breaks the walls of the termite tunnel tubes passing through the zone. The soil from the trench is saturated with termiticide and the trench is filled with this termiticide treated soil. As the termites repair their fractured tunnel tubes, the termites come into contact with the termiticide treated soil and the termiticide is thereby introduced into the colony.

Other methods for controlling termites involve breaking into visible, above ground termite tunnel tubes and injecting a termiticide into the tunnel tubes with a syringe or breaking into visible, above ground termite tunnel tubes and placing a device containing termiticide in the pathways of the termite tunnel tubes. A major problem encountered, when using these methods of termite control, is locating the termite tunnel tubes, which for the most part are hidden behind stucco facings, in wall voids, etc.

In addition to the above methods, there are numerous methods in commercial use for treating termite colonies with termiticides which use termite bait stations, but typically, these methods for treating termite colonies with termiticides use bait stations, such as the termite bait station of U.S. Pat. No. 5,937,571, issued Aug. 17, 1999, which incorporate toxic baits within the termite bait stations, such as slow acting toxicants and/or growth inhibitors. In another method for treating termite colonies with termiticides, the termites are enticed to form a pheromone trail to a bait station to feed on nontoxic sticks of cellulose, such as wood or cardboard. After the members of the termite colony are feeding at the bait station, the pest control technician removes the nontoxic lure and replaces the nontoxic lure with a toxic bait or leaves the nontoxic lure in place and places a toxic bait adjacent the nontoxic lure. U.S. Pat. No. 6,079,150, issued Jun. 27, 2000, discloses such a method of treating termite colonies with termiticides.

When termites ingest termiticides and die shortly after feeding at a bait station, other termites in the colony associate the death of their companions with the new food source (the bait in the bait station) and cease to feed at the bait station. In an attempt to minimize this problem, a slow acting termiticide may be used or toxic baits may be substituted or placed adjacent nontoxic lures after the termites have been feeding at the bait station for a period of time. However, slow acting toxicants can prolong the treatment period required to control the population of a termite colony and any disturbance of the bait in the bait station, through the replacement of the nontoxic lure with a toxic bait may cause the termites to stop feeding at the bait station. Even with the use of slow acting toxicants, most bait stations must be opened and the bait disturbed or removed to determine if there is any termite activity within the bait station.

Thus, there has been a need to provide a method for treating termite colonies which does not use a toxic bait in a bait container; that permits the detection of termite activity within the container of a termite treatment station with little or no disturbance of the lure and termites within the container; that permits the treatment of the termites feeding at the lure within the container with a termiticide without contaminating the lure within the container with the termiticide; and, preferably, that utilizes a termiticide which is non-repellent to termites and lethal to termites through matrix contact as well as ingestion and/or transferal. With a termiticide that functions through matrix contact, the mere contact by a termite with the termiticide initiates a chemical or biological action within the termite that is injurious or lethal to the termite without the termite ever having to ingest the termiticide.

The preferred method and the containers of the present invention accomplish all of the goals listed immediately above. Since most termite tunnel tubes enter a building or structure (hereinafter "building") through cracks in the foundation, expansion joints, and/or control cracks in the floor slab of the building, all of which are generally relatively inaccessible, the preferred method of the present invention utilizes a plurality of containers that each contain a nontoxic cellulose fiber lure to attract the termites to accessible locations outside of the building where a termiticide, preferably, a matrix contact termiticide, can be introduced into soil beneath the containers and the termites tunnel tubes leading from the colony to the containers to treat (control and/or exterminate) the termites.

SUMMARY OF THE INVENTION

While the containers of the present invention can be used for the treatment of other insects with various pesticides, the cellulose fiber lure and containers of the present invention are especially well suited for use in the treatment of termites with termiticides and especially well suited for use in the treatment of termites with termiticides in accordance with the preferred method of the present invention. As used herein the term "pesticide(s)" includes insecticides, termiticides, growth inhibitors and other such substances that are toxic and/or injurious to insects through matrix contact, ingestion or transferal and that are used to treat (control and/or exterminate) termites, ants and other such pests and the tem "termiticides" includes substances that are lethal or injurious to termites through matrix contact, ingestion and/or transferal and that are used to treat (control and/or exterminate) termites.

The cellulose fiber lure of the present invention is a coherent deformable compressible mass of randomly oriented, entangled softwood fibers that is held together by the entanglement of the fibers. Due to its coherent deformable compressible nature, the cellulose fiber lure of the present invention can be conformed to desired shapes, e.g. to hold or at least help hold the cellulose fiber lure within a container of a termite treatment station and to extend through openings in the container so that the lure makes contact with the soil (there is no air gap between the soil and the lure). Depending on the method and termiticide used to treat (control and/or exterminate) the termites at a treatment station, the cellulose fiber lure of the present invention housed in the container of a treatment station may be termiticide free or may contain a termiticide and be a bait.

The containers of the present invention may be used to hold nontoxic or pesticide free lures or toxic or pesticide impregnated bait and are adapted to be located in the ground adjacent a building to attract termites and/or other insects to the container. The container includes: a tube for containing a nontoxic lure, such as the cellulose fiber lure of the present invention, or a bait; a closure closing an upper end of the tube and, preferably, integral with the tube; an opening or openings in, at or adjacent the bottom of the tube; and an anchor or anchors for preventing easy extraction of an installed container from the ground by children, vandals, pets, or by the buoyancy of water within the ground should the ground become saturated by rain, etc.

The one or more openings in, at or adjacent the bottom of the container tube may be formed by the absence of a bottom wall on the tube and permit insects, such as termites, to have subterranean ingress and egress to and from the interior of the container to feed on a lure or bait within the container (e.g. a lure such as the nontoxic cellulose fiber lure of the present invention or a pesticide containing bait within the container). While, to prevent or minimize the escape of methane gases from within the container, it is preferred to have the openings in, at or adjacent the bottom of the container for insect ingress and egress, the container may have openings along the length of the sidewall of the container tube that permit subterranean ingress and egress to and from the interior of the container for feeding on a lure or bait within the container.

The container also has an opening in the closure closing the upper end of the container tube, which, preferably, is centered over an opening in the bottom of the container, for inserting methane measuring or optical probes into and/or through the container and a nontoxic lure or toxic bait within the container to monitor insect activity within the container. Where only a nontoxic lure is to be used within the container, the opening in the closure of the container is used to insert a pesticide injection probe, such as a tube, syringe or nozzle, down through both the container and the opening in the bottom of the container to introduce a pesticide directly into the soil beneath the container and any insect or termite tunnel tubes leading into the container through the opening(s) in the bottom of the container with little or no disturbance of the insects feeding on the nontoxic lure within the container and without introducing the pesticide into the nontoxic lure within the container where the pesticide would contaminate the nontoxic lure. The opening in the closure of the container can also be used to insert a pesticide injection probe into the container to impregnate a previously nontoxic lure within the container with pesticide to form a bait or to insert a pesticide injection probe into both the container and the soil beneath the container to impregnate a previously nontoxic lure within the container with pesticide (forming a bait) and the soil beneath the container with pesticide.

Preferably, the opening in the closure of the container is small enough to prevent children from gaining access to a lure or bait within the container after the container has been installed in the ground and is provided with a flap for sealing, opening and resealing or an adhesive tab or tabs for sealing the opening in the closure of the container to permit the container to be closed except when insect activity within the container is being monitored or pesticide is being introduced into the ground beneath the container or into the container. Preferably, the container includes a metal component, such as but not limited to a foil closure flap or foil adhesive tab for the opening in the closure of the container or a foil label, so that, when the container is partially buried in the ground and grasses or weeds grow up about the container, the location of the container can be detected with a metal detector.

In the preferred method of the present invention for treating termite colonies, the termiticide utilized to treat the termite colony is a non-repellant termiticide that is lethal or injurious to termites through matrix contact as well as through ingestion and/or transferal. With this type of termiticide, it is not necessary for the termites to feed on a toxic bait. By introducing the termiticide into the soil adjacent and preferably beneath the container, the termiticide can be introduced directly into the tunnel tubes adjacent or beneath the container through which the termites travel between the colony nest and the container thereby leaving the container free of toxicants and safe to use where children or pets might gain access to the container. When termites pass through a treated tunnel tube, through contact with the termiticide within the tunnel tube, at least a few molecules of the toxicant within the tunnel tube will adhere to each of the termites. These few molecules of the toxicant initiate a chemical or biological action within the termite that is injurious or lethal to the termite without the termite ever having to ingest the termiticide. In addition, these termites will then carry the toxicant back to the colony nest. Since termites are social insects, other termites will groom the contaminated termites and, in turn, be groomed by other termites to spread the contamination throughout the colony. In this way, the entire colony including the reproductive(s) of the termite colony and the workers feeding upon the building, are destroyed, thereby, eliminating the need to drill holes through the foundation or walls of the building to treat the termites.

DESCRIPTION OF THE PREFERRED EMBODIMENTS

Figure 1:
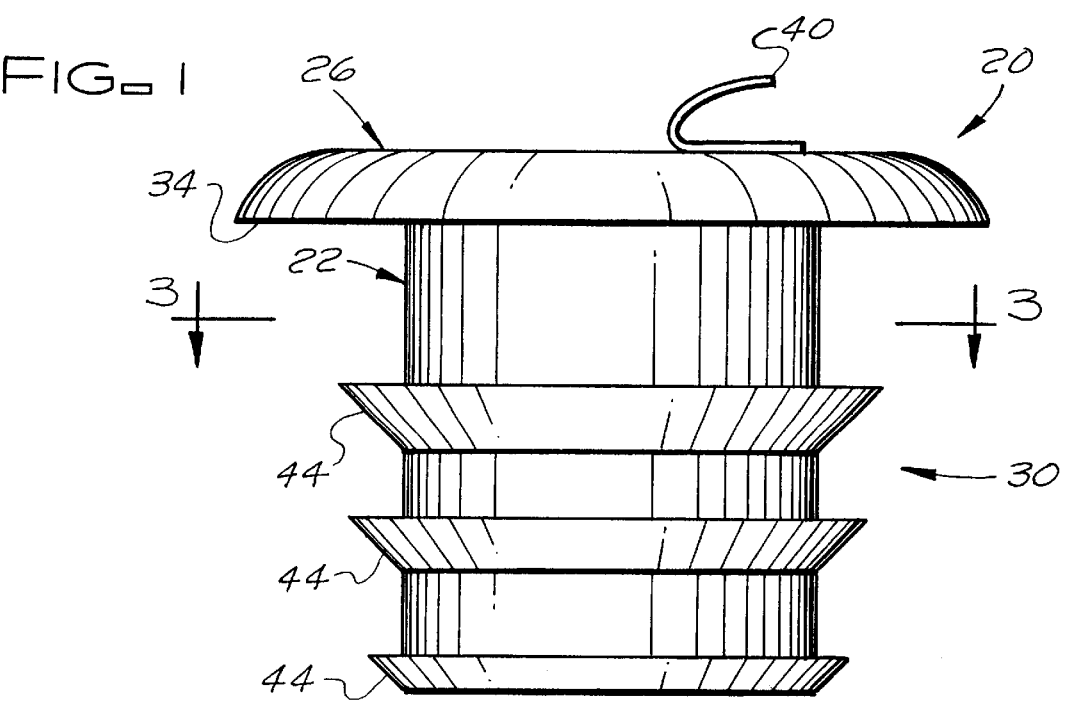
FIG. 1 is a side elevation of a first container of the present invention for containing a lure or bait.
Figure 2:
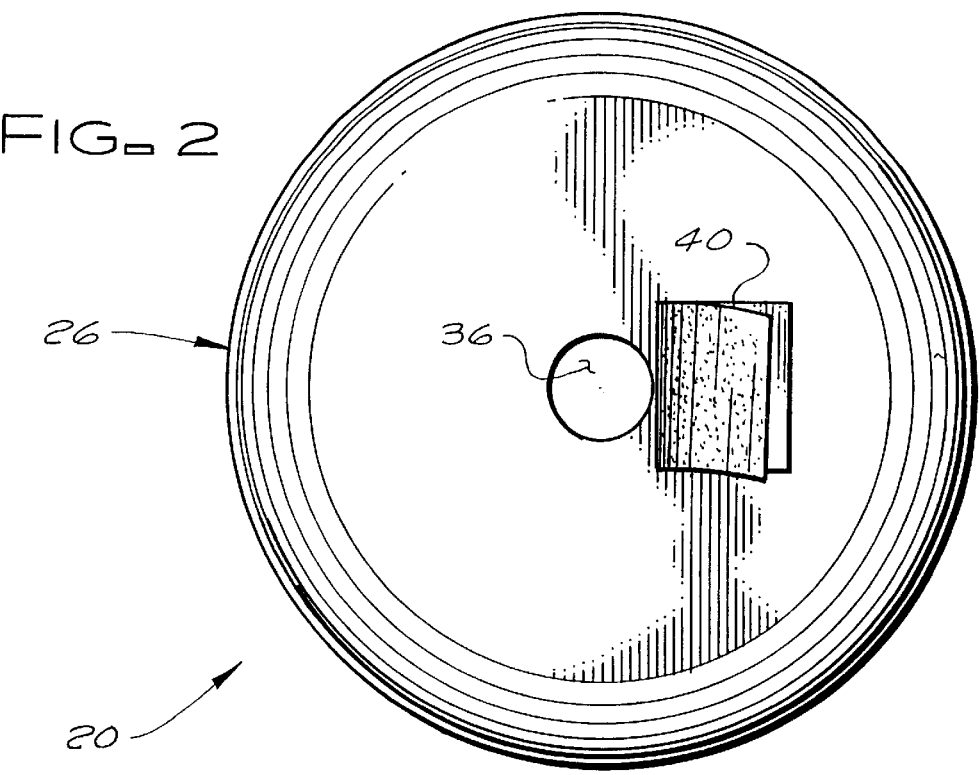
FIG. 2 is a view from above of the container of FIG. 1.
Figure 3:
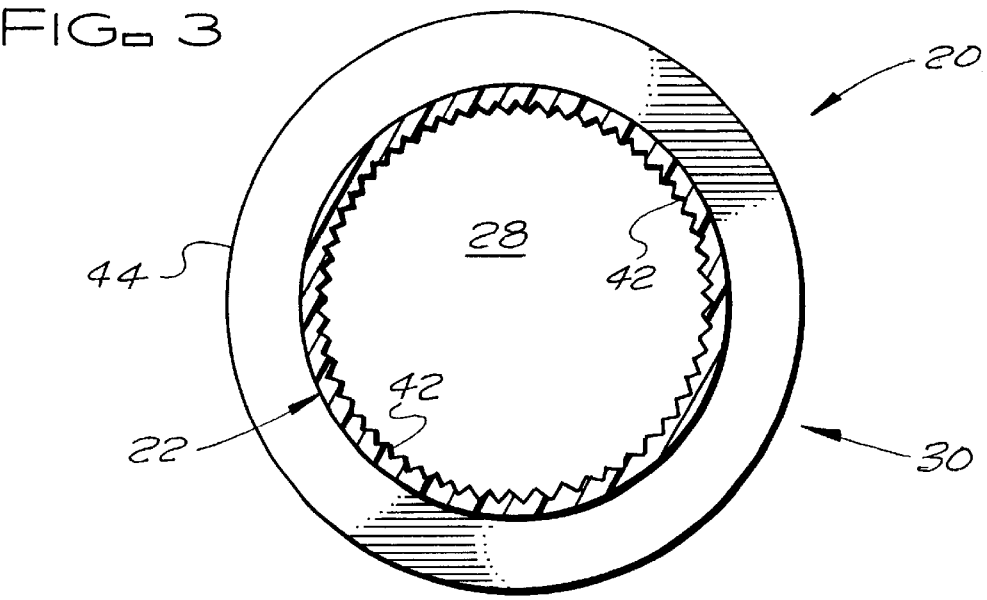
FIG. 3 is a horizontal cross section through the container of FIG. 1, taken substantially along lines 3—3 of FIG. 1.

The preferred cellulose fiber lure of the present invention is a coherent deformable compressible mass of randomly oriented, entangled softwood fibers that is held together by the entanglement of the fibers and that can be conformed to desired shapes, such as the interior of a termite treatment station container and openings in the container to fill the container and its openings. The cellulose fiber lure lumps can be torn apart to form smaller lumps of cellulose fiber lure and, when compressed, the cellulose fiber lure of the present invention exhibits a resilience that causes the cellulose fiber lure of the present invention to at least partially recover and, preferably, substantially entirely recover its precompressed thickness when the compressive forces are released, e.g. 50% to substantially all of its precompressed thickness. The cellulose fiber lure of the present invention may be in the form of deformable compressible coherent fibrous lumps or masses of different sizes and shapes, e.g. lumps with dimensions of about ¼, ½, ¾, 1 and/or 2 inches or more. When small deformable compressible coherent fibrous lumps or masses of the cellulose fiber lure of the present invention are tamped down within a termite treatment station container or otherwise pressed together, the lumps deform and the fibers of adjacent lumps become entangled together to form larger coherent lumps of the cellulose fiber lure or to form a larger coherent mass of the cellulose fiber lure formed into a specific desired shape, e.g. the inside shape of a container.

The preferred softwood fibers used to form the coherent deformable mass of randomly oriented, entangled softwood fibers are predominately bleached loblolly pine fibers that are elemental chlorine free. One source of such fibers can be obtained by hammer milling uncoated free sheets of market pulp such as market pulp sold by Georgia Pacific Corporation under the trade designation "Leaf River 90 Softwood" "Southern Bleached Softwood" market pulp. This market pulp is a long fiber (typically 2.47 mm in average length with a coarseness of about 0.293 mg/m) bleached southern softwood pulp that is Elemental Chlorine Free (ECF) and typically includes 90% loblolly pine and 10% longleaf and slash. This preferred cellulose fiber lure can be used free of any pesticide, as a nontoxic lure, or may be impregnated with a pesticide to form a bait and may include binder.

Preferably, the cellulose fiber lure of the present invention is prepared from pressed sheets of digested, bleached and washed softwood fibers, e.g. loblolly pine fibers, such as the 42×45×3/32 inch sheets of market pulp discussed above that are sold by Georgia Pacific Corporation under the trade designation "Leaf River 90 Softwood" "Southern Bleached Softwood" market pulp. These pressed sheets are broken up, e.g. with a hammer mill, to release the softwood fibers from the sheets. The released softwood fibers are mixed with large quantities of air to form a mixture of air and softwood fibers that fluffs the released softwood fibers. The mixture of air and softwood fibers is then strained through a porous cloth or screen to form a coherent deformable compressible mass of randomly oriented entangled softwood fibers that is held together by the entanglement of the fibers.

This coherent deformable compressible mass of randomly oriented entangled softwood fibers, which typically has a consistency of a cotton ball, conforms to and fills a termite treatment station container and openings in the container for subterranean ingress and egress of termites. Termites can easily burrow into the mass and the mass is easy for termites to digest. The mass easily absorbs moisture, pesticides or termiticides when applied to the mass and readily clings to the interior walls of a container, such as a termite treatment station container. The mass is ready for the termites to eat, and unlike baits previously used, such as wood sticks, does not need separation or a fungus to break it down for easy consumption by the termites.

As shown in FIGS. 1 to 4, a first embodiment 20 of the lure or bait container of the present invention includes a tube 22 for containing a nontoxic lure or a toxic bait 24 (preferably the cellulose fiber lure of the present invention); a closure 26 that closes an upper end of the tube 22; an opening 28 at a lower end of the tube 22; and anchors 30 for anchoring the lure or bait container 20 within and preventing easy extraction of the lure or bait container from the ground 32, e.g. by children, vandals, pets and/or by the buoyancy of water within the ground should the ground become saturated by rain, etc. Preferably, the lure or bait container 20 is molded and made from an ABS polymeric material with UV inhibitors or some other conventional polymeric material. While, as shown, the tube 22 of the lure or bait container 20 has a generally circular horizontal cross section, the lure or bait container may have a rectangular, oval or other horizontal cross section. Typically, the lure or bait container 20 has a volume of about thirty to fifty cubic inches or more to contain a sufficient amount of lure or bait for treatment of the insects by whatever method of treatment being employed, e.g. a sufficient amount for a termite colony to feed on for a sufficient period of time to permit monitoring of the container and treatment of the lure within the container or the termite tunnel tubes leading to the container with a termiticide. A typical lure or bait container 20 with a circular horizontal cross section will normally be about three to five inches in diameter by about three to five inches in height.

Figure 4:
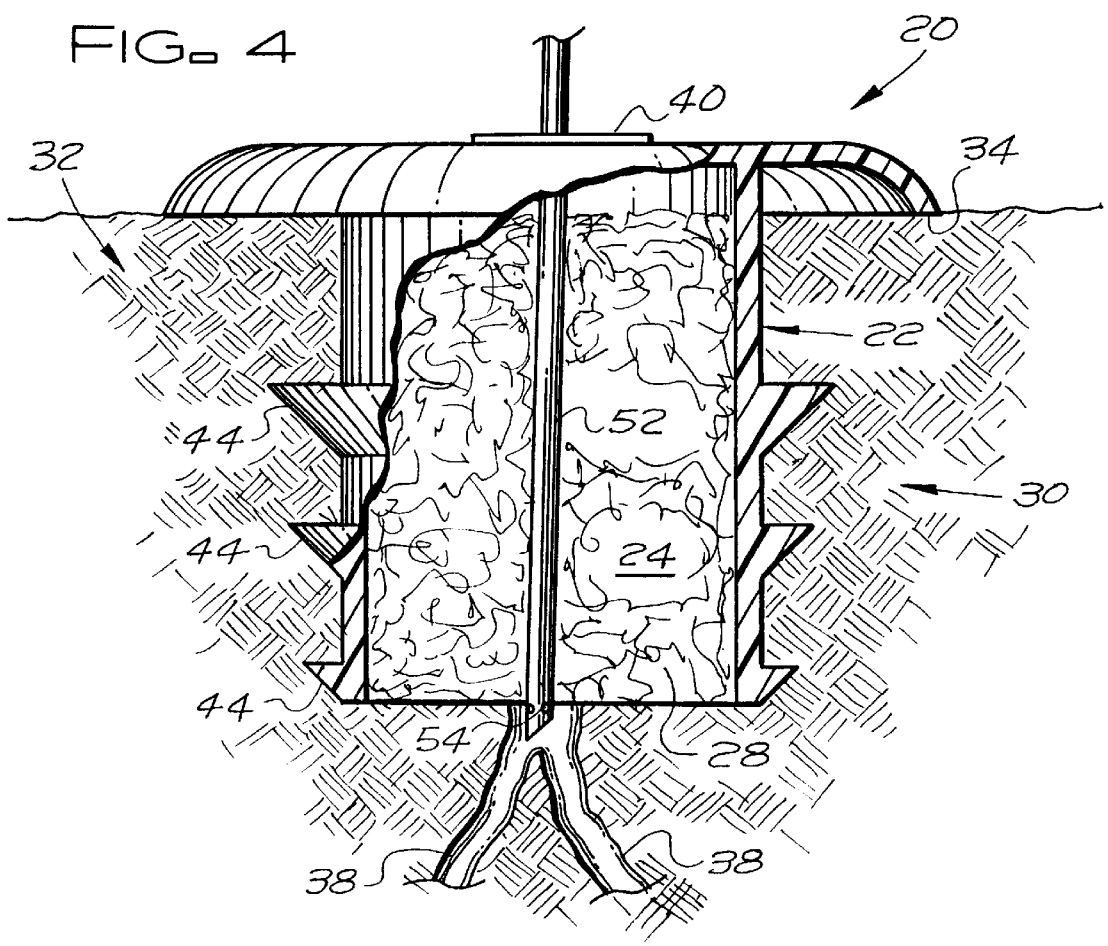
FIG. 4 is a partial vertical cross section through the container of FIG. 1 showing the container partially buried with the upper closure of the container resting on the surface of the ground; either a nontoxic lure or a toxic bait within the container; and a probe inserted down through the container.

The closure 26 of the lure or bait container 20 is integral with the tube 22 of the container so that the lure or bait container 20 can be molded in one piece and so that, once the lure or bait container is installed in the ground 32 as shown in FIG. 4, the closure 26 can not be removed from the container and children, pets or vandals do not have easy access to the contents of the container. The closure 26 has an annular flange 34 that is adapted to contact the surface of the ground 32 when the lure or bait container 20 is properly installed in the ground. The closure 26 includes an opening 36 that is large enough (typically about ⅝ to about ⅞ of an inch in diameter) to permit the monitoring of insect activity within the lure or bait container 20 with the probe of a methane gas detector or a fiber optic device, and the insertion of a probe such as a hollow rod or nozzle into the lure or bait container 20 to dispense a pesticide or termiticide into the lure within the container or through the lure or bait container 20 and the opening 28 in the bottom of the container to introduce a pesticide or termiticide into the soil beneath the container and the insect tunnel tubes 38 beneath and leading into the container through the opening 36. Preferably, when insect activity, such as termite activity, is being monitored through the detection of methane gas, the opening 36 in the closure 26 of the lure or bait container 20 is small enough to prevent the excessive escape of methane gas from within the container while performing the monitoring procedure. Preferably, the opening 36 in the closure 26 of the lure or bait container 20 is centered over the opening 28 in the bottom of the container so that, when the lure within the container is to remain nontoxic, the insertion of a hollow pesticide or termiticide injection or delivery probe, e.g. a syringe tube, through the opening 36 in the closure 26 of the container, through the interior of the container, through an opening 28 in the bottom of the container, and into the soil beneath the container is facilitated to dispense a pesticide or termiticide directly into the tunnel tubes 38 leading into the opening 28 without introducing the pesticide or termiticide into the container where the pesticide or termiticide would contaminate the nontoxic lure.

Preferably, the opening 36 in the closure of 26 of the lure or bait container 20 is provided with a closure device or devices for sealing, opening and resealing the opening 36 in the closure, such as but not limited to a closure flap 40. Preferably, the closure flap 40 is adhesively secured to the upper surface of the closure 26 by a pressure sensitive adhesive so that the closure flap 40 can be repeatedly peeled back from the opening 36 to permit the insertion of probes into the interior of the lure or bait container 20 and repeatedly resealed over the opening 36 to close the opening after the probe is removed from the container or the closure flap 40 is pierced with the probe as shown in FIG. 4 and after the probe is removed from the container 20 a new closure flap 40 is superimposed upon and adhesively bonded to the closure and/or punctured flap to reseal the opening 36. While the closure flap or flaps 40 may be made of other flexible materials, preferably, the closure flap or flaps 40 are made of a metal foil, a metallized polymeric film, a metallized paper, a metal foil polymeric film laminate, or a metal foil paper laminate. Once peeled back, a closure flap 40, even though it has not been punctured or pierced with a probe, may also be removed and replaced with a new closure flap.

Preferably, the opening 28 at the bottom of the lure or bait container 20 is formed by having the lower end of the tube 22 completely open or substantially completely open to permit subterranean insect ingress and egress to and from the interior of the container so that the insects can feed on the lure or bait within the container and establish insect tunnel tubes between a colony nest and the lure or bait container. However, where the lower end of the tube is not completely open or substantially completely open, the lure or bait container 20 must have one or more openings at or adjacent the bottom of the container which are each large enough to permit subterranean insect ingress and egress to and from the interior of the container 20 so that the insects can feed on the lure or bait within the container and establish insect tunnel tubes between the colony nest and the container. While it is preferred to have the openings in, at or adjacent the bottom of the container for insect ingress and egress and to help prevent the escape of methane gases from the container, the container may have or include openings along the length of the sidewall of the container tube that permit subterranean ingress and egress to and from the interior of the container for feeding on a lure or bait within the container.

Preferably, the interior surface of the tube 22 has a roughened surface or has a series of vertically or longitudinally extending ribs 42 that cover the interior surface of the tube, e.g. the ribs project inwardly about $\frac{1}{16}$ to about $\frac{3}{32}$ of an inch and are spaced about $\frac{1}{8}$ of an inch apart, and extend from the upper end to the lower end of the tube. The roughened surface or vertically extending ribs 42 provide an interior surface for the tube 22 that better retains a lure or bait within the container than a smooth interior surface. In addition, when the cellulose fiber lure of the present invention is tamped down and confined within the container 20, the forces generated by the resilience of the compressed and shaped coherent mass of entangled, randomly oriented softwood fibers and exerted against the interior surface of the container may also help to hold the shaped coherent mass of entangled, randomly oriented fibers in place within the container.

The exterior surface of the tube 22 is provided with the anchor 30 for anchoring the lure or bait station container 20 within the ground and preventing easy extraction of the container from the ground, once the container has been installed in the ground, by children, vandals, pets, and/or by the buoyancy of water within the ground should the ground become saturated by rain, etc. Preferably, the anchor 30 is a series of two or more, vertically spaced apart, horizontally extending annular ribs or barbs 44 that encircle the outer surface of the tube 22. The annular ribs or barbs 44 are located on the tube 22 so that when the lure or bait station container 20 is properly installed in the ground 32 with the closure flange 34 resting on the ground, the ribs or barbs 44 are located beneath the surface of the ground with the uppermost annular rib or barb of the anchor, preferably, being at least $\frac{3}{4}$ of an inch to 1 inch below the surface of the ground. In a preferred embodiment of the lure or bait station container 20, each of the ribs or barbs 44 has a substantially triangular transverse cross section with an upper surface projecting outward from the exterior surface of the tube in a direction substantially perpendicular to the exterior surface of the tube and a lower surface inclined inwardly from an outer edge of the upper surface of the rib or barb toward the exterior surface and the lower end of the tube. In this preferred embodiment, the container tube 22 is about 3 and $\frac{1}{2}$ inches long by about 3 inches in diameter, the uppermost rib or barb 44 of the anchor 30 is about 1 inch below the bottom of the closure flange 34; the uppermost rib or barb 44 extends outward from the exterior surface of the tube farther than an intermediate rib or barb 44; and the intermediate rib or barb 44 extends outward from the exterior surface of the tube more than the lowermost rib or barb 44 of the anchor (e.g. the uppermost rib or barb projects outward about $\frac{1}{2}$ of an inch; the intermediate rib or barb 44 projects outward about $\frac{3}{8}$ of an inch; and the lowermost rib or barb 44 projects outward about $\frac{1}{4}$ of an inch).

Figure 8:
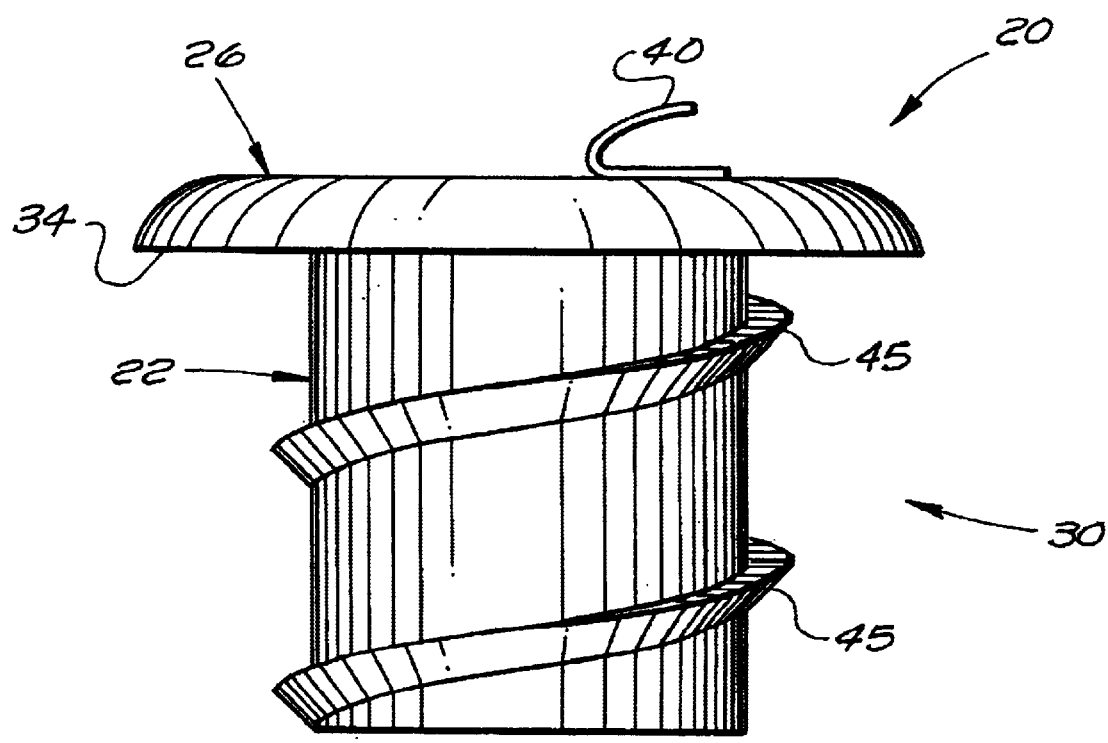
FIG. 8 is a side elevation of a container of the present invention with a spiral anchoring rib. pg,8

While preferably, the ribs or barbs 44 are continuous annular ribs or barbs, the ribs or barbs 44 may also be discontinuous. It is also contemplated that, instead of a series of continuous or discontinuous annular ribs or barbs 44, the anchor could be formed by one spiral rib or barb 45 that encircles the tube for one or more turns as shown in FIG. 8. It is further contemplated that the tubular portion of the container could have an inverted cone shape or have an inverted frustoconical shape with one or more continuous or discontinuous annular ribs or barbs or a continuous or discontinuous spiral rib or barb to facilitate screwing the container into the ground.

Figure 5:
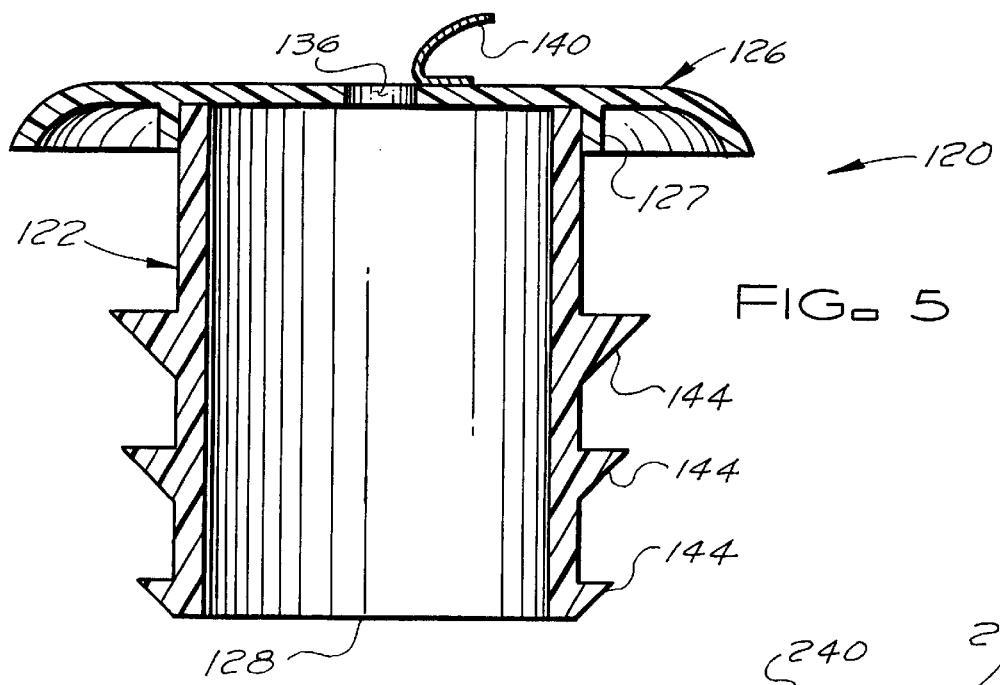
FIG. 5 is a vertical cross section through a second embodiment of the container of the present invention that has a closure that may be removable or may be permanently secured to the tubular portion of the container.

FIG. 5 shows a second embodiment 120 of the lure or bait container of the present invention. Except for the closure 126, with its depending annular flange 127, which may be removable or may be permanently secured to the upper end portion of the tube 122, the lure or bait container 120 is the same as the lure or bait container 20. The closure 126 may be a lid with an annular flange depending therefrom that is internally or externally threaded and screws onto mating internal or external threads (not shown) on the upper end portion of the tube 122; the closure 126 may be a lid with an annular flange depending therefrom that is bonded, adhesively or otherwise, to an inner or outer surface of the upper end of the tube 122; the closure 126 may be a lid with an annular flange depending therefrom with an annular rib that snaps into place over an annular rib on or into an annular groove in the upper end portion of the tube 122; or the closure may be a lid otherwise secured to the upper end portion of the tube 122. While, as discussed above, it is preferred to have the closure integral with or permanently secured to the tubular portion of the container, e.g. to keep children, vandals and pets from gaining access to the contents of the container, for certain applications it may be beneficial to have a closure that may be removed to gain access to the interior of the container. While the anchor, as shown in FIG. 5, is formed from a series of continuous or discontinuous annular ribs or barbs 144, the anchor for the container 120 may be formed by one continuous or discontinuous spiral rib or barb that encircles the tube 122 one or more times. It is also contemplated that the tubular portion of the container could have an inverted cone shape or have an inverted frustoconical shape with one or more continuous or discontinuous annular ribs or barbs or a continuous or discontinuous spiral rib or barb to facilitate screwing the container into the ground.

Figure 6:
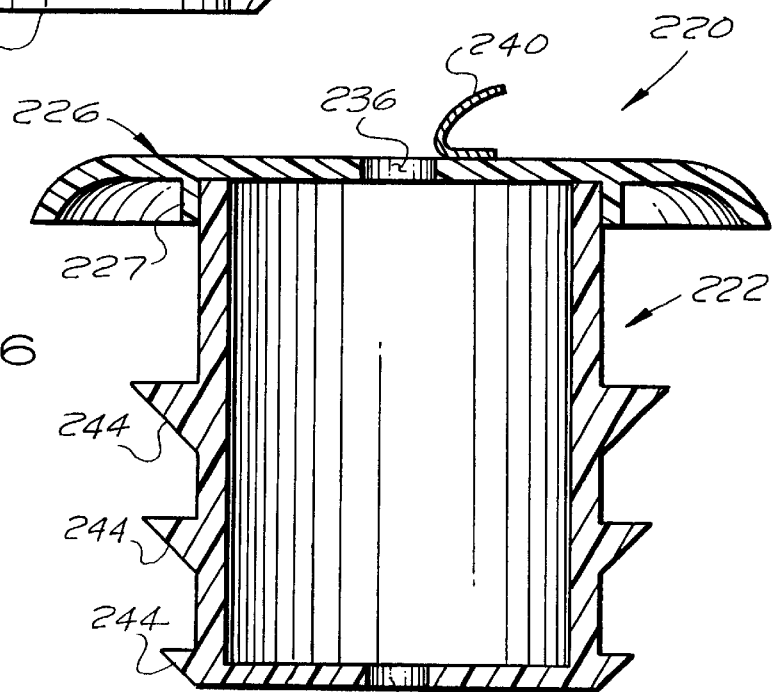
FIG. 6 is a vertical cross section through a third embodiment of the container of the present invention that has a closure that may be removable or may be permanently secured to the tubular portion of the container and a bottom wall with an opening therein.

FIG. 6 shows a third embodiment 220 of the lure or bait container of the present invention. Except for the closure 226, with its depending annular flange 227, that may be removable or permanently secured to an upper end portion of the tube 222 and a smaller opening 228 that is located in a lower wall of the tube 222, the lure or bait container 220 is the same as the lure or bait container 20. The closure 226 may be a lid with an annular flange depending therefrom that is internally or externally threaded and screws onto mating internal or external threads (not shown) on the upper end portion of the tube 222; the closure 226 may be a lid with an annular flange depending therefrom that is bonded, adhesively or otherwise, to an inner or outer surface of the upper end of the tube 222; the closure 226 may be a lid with an annular flange depending therefrom with an annular rib that snaps into place over an annular rib on or into an annular groove in the upper end portion of the tube 222; or the closure may be a lid otherwise secured to the upper end portion of the tube 222. While, as discussed above, it is preferred to have the closure integral with or permanently secured to the tubular portion of the container, e.g. to keep children, vandals and pets from gaining access to the contents of the container, for certain applications it may be beneficial to have a closure that may be removed to gain access to the interior of the container. While the anchor, as shown in FIG. 6, is formed from a series of continuous or discontinuous annular ribs or barbs 244, the anchor for the container 220 may be formed by one continuous or discontinuous spiral rib or barb that encircles the tube 222 one or more times. With its smaller opening 228 in the lower wall of the tube to help retain a lure or bait within the lure or bait container, e.g. an opening typically about ½ to about ⅞ of an inch in diameter, it is also contemplated that the tube 222 of the lure or bait container 220 could vary in diameter, being greater in diameter at the bottom than the top to form a frustoconical shaped tube wherein the increasing horizontal cross section of the tube from top to bottom causes the exterior sidewall of the tube to function as an anchor.

When the lure or bait containers 20, 120 or 220 are buried or when grass or weeds grow up about the containers, the metal portions of the closure flaps 40, 140 and 240 may be used to detect the location of the lure or bait container with a conventional metal detector. In addition to the metal in the closure flaps 40, 140 and 240 or in lieu of the metal in the closure flaps 40, 140 and 240, labels including a metal portion, e.g. metallized polymeric films or a metal foils, or metal components forming part of the containers may also be used as an aid in locating the lure or bait containers with metal detectors.

Figure 7:
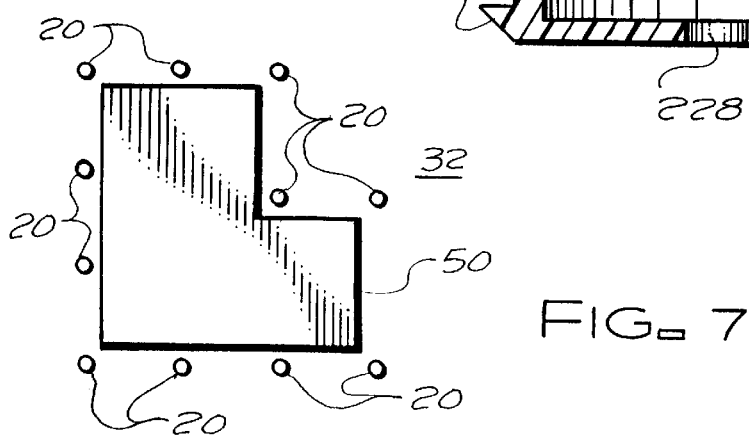
FIG. 7 is a schematic plan view of a building with containers located in treatment stations adjacent the foundation of the building in accordance with the method of the present invention.

In the preferred method of the present invention for treating termite colonies, one or more containers 20, 120 or 220 are located adjacent the foundation 50 of a building, e.g. as schematically shown with containers 20 in FIG. 7. The containers 20, 120 or 220 are spaced from each other, e.g. at ten foot intervals, and, as needed, may be spaced about the entire periphery of the building foundation or a portion of the periphery of the building foundation. The containers 20, 120 or 220 are filled with a nontoxic lure, such as but not limited to the deformable compressible, coherent cellulose fiber lure of the present invention with the lure preferably filling both the interior of the container and the openings in the container that give termites subterranean ingress to and egress from the interior of the container so that there are no air gaps between the soil and the lure (the absence of an air gap between the soil and the lure enables termites to more readily find the lure). The containers are buried in the ground 32 at the selected locations and anchored in place so that the containers cannot be easily removed and, once the termites commence feeding at the container, the termites will not be disturbed. The openings 28, 128 or 228 in the bottom of each container 20, 120 or 220 are located beneath the surface of the ground so that the termites can gain subterranean ingress and egress to and from the containers 20, 120 and 220.

The containers 20, 120 or 220 are left in place and periodically checked for termite activity. To check or monitor a container for termite activity, the container 20, 120 or 220 is first located either visually or, if the container is buried or hidden by grass or weeds, preferably, with a metal detector. Termites give off methane gas and the greater the number of termites feeding on the nontoxic lure within a container 20,120 or 220, the higher the concentration of methane gas within the container 20, 120 or 220. Thus, one preferred method of checking the containers 20, 120 or 220 for termite activity is to measure the concentration of methane gas within each container 20, 120 or 220 with a commercially available, methane gas detector, such as but not limited to a methane detector marketed by Pestube Systems, Inc. of Chandler Ariz. that is calibrated to indicate the level of termite activity within the container and emits an audible signal that changes in frequency in proportion to the amount of methane detected within the container. Another preferred method of determining if there is termite activity within a container 20, 120, or 220 is to observe the activity visually within the container by means of a fiber optic device such as but not limited to a fiber optic scope marketed by Pestube Systems, Inc. of Chandler, Ariz. Once a container 20, 120 or 220 is located, and uncovered, if necessary, the closure flap 40, 140 or 240 is peeled back from the opening 36, 136 or 236 in the closure 26, 126 or 226 of the container and a probe of the methane detector or the fiber optic device is inserted into the container through the opening 36, 136 or 236 to detect methane gas levels within or visually observe any termites within the container 20, 120 or 220 without disturbing any termites that might be feeding in the container 20, 120 or 220. While it is preferred to use a methane gas detector or a fiber optic device to determine if termites are active within a container 20, 120 or 220 and while it is believed that a mere visual inspection without the aid of a fiber optic device would be much less effective, require a stirring up of the lure within the container, and the disturbance of any termites feeding within the container, it is also contemplated that a service technician may merely look into the container through the opening 36, 136 or 236 in the closure of the container to determine if there is any termite activity within the container.

If termites are found to be actively feeding within a container 20, 120 or 220 the termiticide is administered. As schematically shown in FIG. 4, preferably, the termiticide is administered by inserting a hollow probe 52 (e.g. a long slender hollow tube similar to a long hypodermic needle that may be pointed at the end to facilitate puncturing a seal on the container closure and the penetration of the soil beneath the container and that has a series of openings 54 adjacent its lower end to dispense a pesticide or termiticide radially out from the tube in all directions) which leads from a source of termiticide, down through the opening 36, 136 or 236 in the closure 26, 126 or 226 of the container, through the interior of the container, through the opening 28, 128 or 228 in the bottom of the container, and into the soil and the portions of termite tunnel tubes 38, extending between the colony nest and the opening 28, 128 or 228, beneath the container. When performing this step, the probe 52 may break through the walls of the termite tunnel tubes and/or be inserted into the entrances or mouths of the termite tunnel tubes 38. Once the probe 52 is thus positioned, the termiticide is injected directly into the soil adjacent the container (preferably saturating the soil beneath the container) and the termite tunnel tubes beneath the container, but not into the nontoxic lure within the container. An alternative method of injecting the termiticide into the termite tunnel tube(s) 38 beneath a container 20, 120 or 220 involves passing the probe 52 at an angle through the soil from the ground surface adjacent the container until the probe 52 penetrates one or more tunnel tubes beneath the container and injecting the termiticide into the soil and the tunnel tube(s) beneath the container. As the termites repair the tunnel tubes with the treated soil and continue to pass back and forth through the treated termite tunnel tube(s) 38 to feed on the nontoxic lure within the container 20, 120 or 220 the termiticide in the soil and tunnels contacts and adheres to the termites which carry the termiticide back to colony.

In the preferred method of the present invention, the termiticide injected into the soil and the termite tunnel tube(s) 38 beneath the container 20, 120 or 220 is non-repellent to termites and lethal or injurious to termites through matrix contact as well as through ingestion and/or transferal. An example of a preferred termiticide, which is non-repellent to termites and lethal to termites through matrix contact as well as through ingestion and/or transferal, is a termiticide containing fipronil as its active ingredient. Aventis Environmental Science USA of Montvale, N.J. sells such a termiticide under the trade designation "TERMIDOR". Since the termites do not smell, see or feel this termiticide, the termites continue to pass freely through the treated area of the tunnel tube(s) picking up the termiticide and carrying the termiticide back to the colony nest. In the colony nest, other termites that contact the contaminated termites through feeding or grooming or through cannibalizing the termites killed by the termiticide become carriers of the termiticide thereby spreading the termiticide throughout the colony.

While not a preferred method of utilizing the containers 20, 120 or 220 of the present invention to treat a termite colony with termiticide, after termite activity is detected within a container 20, 120 or 220, it is contemplated that the termiticide, e.g. a termiticide containing fipronil, may be introduced into the container 20, 120 or 220, e.g. with the probe 52, to saturate, impregnate, coat or otherwise contaminate the previously nontoxic lure within the container with the termiticide. The termites feeding in the container 20, 120 or 220 will thus come into contact with the termiticide on the now toxic lure, ingest the termiticide by feeding on the toxic lure, and/or have the termiticide transferred to themselves through contact with other termites. With this method the soil beneath the container 20, 120 or 220 may also be saturated with the termiticide, e.g. through the flow of termiticide down through the opening 28, 128 or 228 in the bottom of the container and/or by passing the probe 52 down through the opening 28, 128 or 228 in the bottom of the container and ejecting the termiticide from the probe 52 directly into the soil and termite tunnel tubes.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A termite lure container adapted to be installed in the ground, comprising:

a tube for containing a coherent, deformable, compressible and resilient termite lure formed of a mass of randomly oriented, entangled softwood fibers that is held together by entanglement of the fibers and can be formed to desired shapes; the tube having an upper end and a lower end;

a closure closing the upper end of the tube and adapted to be located at ground level when the container is installed; an opening in the closure for permitting a monitoring of termite activity within the container and through which probes may be inserted into the container; means for sealing the opening in the closure;

an opening at the lower end of the tube making the lower end of the tube at least substantially completely open for permitting subterranean ingress and egress of termites into and out of the tube;

a coherent, deformable, compressible and resilient termite lure formed of a mass of randomly oriented, entangled, softwood fibers that is held together by entanglement of the fibers and can be formed into desired shapes housed within the tube; the resilience of the termite lure helping to hold the termite lure in place within the tube; a portion of the termite lure filling the opening at the lower end of the tube that permits subterranean ingress and egress of termites into and out of the tube so that the container can be located in the ground with no air gap between the portion of the termite lure filling the opening at the lower end of the tube and soil beneath the container; and anchoring means for anchoring the container within and preventing easy extraction of the container from the ground.

2. The termite lure container according to claim 1, wherein:

the closure and the tube are integral.

3. The termite lure container according to claim 1, wherein:

the tube has a substantially constant diameter from the upper end to the lower end of the tube.

4. The termite lure container according to claim 3, wherein:

an interior surface of the tube has retaining means to facilitate retention within the tube of the termite lure.

5. The termite lure container according to claim 4, wherein:

the retaining means is a plurality of ribs on the interior surface of the tube that are integral with and extend longitudinally with respect to the tube.

6. The termite lure container according to claim 5, wherein:

the anchoring means is formed by rib means on an exterior surface of, encircling and integral with the tube for preventing easy extraction of the container from the ground.

7. The termite lure container according to claim 6, wherein:

the rib means has a substantially triangular transverse cross section with an upper surface projecting outward from the exterior surface of the tube in a direction substantially perpendicular to the exterior surface of the tube and a lower surface inclined inwardly from an outer edge of the upper surface of the rib toward the exterior surface and a lower end of the tube.

8. The termite lure container according to claim 6, wherein:

the rib means an annular rib.

9. The termite lure container according to claim 6, wherein:

the rib means includes an uppermost annular rib and a lowermost annular rib and the uppermost annular rib projects outward from the exterior surface of the tube a distance greater than the lowermost annular rib projects outward from the exterior surface of the tube.

10. The termite lure container according to claim 6, wherein:

the rib means is a spiral rib with an uppermost portion of the spiral rib projecting outward from the exterior surface of the tube a distance greater than a lowermost portion of the spiral rib projects outward from the exterior surface of the tube.

11. The termite lure container according to claim 1, wherein:

the termite lure contains a pesticide.

12. The termite lure container according to claim 1, wherein:

the softwood fibers forming the termite lure are predominately bleached loblolly pine fibers and the termite lure contains a pesticide.

13. The termite lure container according to claim 1, wherein:

the termite lure contains a non-repellant termiticide that is lethal or injurious to termites through matrix contact, ingestion and/or transferal.

14. The termite lure container according to claim 1, wherein:

the softwood fibers forming the termite lure are predominately bleached loblolly pine fibers; and the termite lure contains a non-repellant pesticide that is lethal or injurious to termites through matrix contact, ingestion and/or transferal.

* * * * *